United States Patent
Mitchell

(10) Patent No.: US 11,518,329 B2
(45) Date of Patent: Dec. 6, 2022

(54) SAFE BABY BELT

(71) Applicant: Delois Mitchell, Lakeland, FL (US)

(72) Inventor: Delois Mitchell, Lakeland, FL (US)

( * ) Notice: Subject to any disclaimer, the term of this patent is extended or adjusted under 35 U.S.C. 154(b) by 0 days.

(21) Appl. No.: 17/142,367

(22) Filed: Jan. 6, 2021

(65) Prior Publication Data

US 2021/0276485 A1  Sep. 9, 2021

Related U.S. Application Data

(60) Provisional application No. 62/986,825, filed on Mar. 9, 2020.

(51) Int. Cl.

| | | |
|---|---|---|
| *B60R 21/01* | (2006.01) | |
| *B60R 22/48* | (2006.01) | |
| *B60R 21/00* | (2006.01) | |
| *B60Q 9/00* | (2006.01) | |
| *H04R 1/08* | (2006.01) | |
| *H04R 3/00* | (2006.01) | |

(52) U.S. Cl.
CPC ............. *B60R 21/01* (2013.01); *B60R 21/00* (2013.01); *B60R 22/48* (2013.01); *B60Q 9/00* (2013.01); *B60R 2022/4808* (2013.01); *B60R 2022/4866* (2013.01); *H04R 1/08* (2013.01); *H04R 3/00* (2013.01); *H04R 2499/13* (2013.01)

(58) Field of Classification Search
CPC ......... B60R 21/00; B60R 21/01; B60R 21/32; B60R 22/48; B60N 2/00; B60N 2/002; B60N 2/28; B60N 2/2815; B60Q 9/00
See application file for complete search history.

(56) References Cited

U.S. PATENT DOCUMENTS

| | | | |
|---|---|---|---|
| 2004/0149507 A1* | 8/2004 | Baskin | B60R 21/01556 180/271 |
| 2016/0347213 A1* | 12/2016 | Pretta | B60N 2/2842 |
| 2017/0021800 A1* | 1/2017 | Seibert | B60N 2/2812 |
| 2020/0298782 A1* | 9/2020 | Zancanato | G08B 21/24 |

OTHER PUBLICATIONS

NPL Search (Feb. 4, 2022).*

* cited by examiner

*Primary Examiner* — Van T Trieu
(74) *Attorney, Agent, or Firm* — Brennan, Manna & Diamond, LLC

(57) ABSTRACT

A backseat child occupancy safety alert system. More specifically, the invention relates to a system that can be used in any vehicle and includes a plurality of sensors that cover the seat belt buckles of a vehicle to detect the motion of the seat belt buckle within the seat belt housing. Each sensor is in electrical communication and powered by a tether that allows one sensor to communicate to the other or a display via a flashing LED screen and audible tone if a child is still buckled into the rear vehicle seat after a user attempts to exit the vehicle via the driver's seat. The system is powered continuously by a USB or other power outlet in the vehicle. A kit for retrofitting a vehicle with the system and method of installing the system are also provided.

6 Claims, 7 Drawing Sheets

SAFE BABY BELT

CROSS-REFERENCE TO RELATED APPLICATION

The present application claims priority to and the benefit of U.S. Provisional Application No. 62/986,825 filed on Mar. 9, 2020, which is incorporated herein by reference in its entirety.

BACKGROUND

The present invention relates generally to a new and improved backseat child occupancy alert system. More specifically, the invention relates to a system that can be used in any vehicle. The system uses sensors that cover the seat belt buckles of a vehicle to detect the motion of the seat belt buckle within the seat belt housing. The sensors communicate with each other and the user via a flashing LED screen and audible tone if a child is still buckled into the rear vehicle seat after a user attempts to exit the vehicle via the driver's seat. The system is powered by a USB or power outlet or receptacle in a vehicle. Accordingly, the present specification makes specific reference thereto. However, it is to be appreciated that aspects of the present invention are also equally amenable to other like applications, devices and methods of manufacture.

On average, approximately 39 children under the age of 15 die each year from heatstroke due to being left in a vehicle unattended on a hot day in the United States. In recent years, the actual death toll has far exceeded this average, with a record number of 53 deaths occurring in 2018 and 52 deaths occurring in 2019. Further, every state in the United States has experienced at least 1 of such deaths every year since 1998. These accidents are entirely preventable if greater care were taken.

In an effort to prevent such a large number of easily avoidable and tragic child and infant deaths, many devices and systems have been created with the goal of reminding a driver that a child or infant is in the backseat of the vehicle as or before the driver exits or attempts to exit the vehicle. One of such systems is General Motor's (GM's) Rear Seat reminder technology, which is present in many Buick, Cadillac, Chevrolet, and GMC vehicles on and after the 2018 model year. This GM system alerts a user to check their backseat when exiting their vehicle via a digital dashboard alert and an audible tone by monitoring the opening/closing of the rear doors of the vehicle in relation to the starting/stopping of the engine.

Other devices exist in the form of child car seats that have integrated safety features. Such devices are known to feature a sensor monitoring system that can be paired with a mobile application to alert a driver or other adult when they are walking away from or exiting their vehicle with a child remaining behind via an audible alert tone or other means. In addition, devices exist in the art that have a battery powered clip-on sensor for seatbelts or car seats that may also communicate with a mobile application to alert an adult when they are walking away from or exiting their vehicle with a child remaining behind in the vehicle via an audible alert tone, flashing lights or other means.

However, the devices and systems that exist and were described above contain of plurality of inherent functional limitations, inefficiencies, and other design flaws that can and do severely impact the functionality of each device or system. Systems such as GM's Rear Seat reminder technology have a plurality of limitations, with the one being that the system is only present in GM vehicles that were made in 2018 or later. Thus, this technology and the benefits of the technology is not readily accessible to a large portion of the population who may not be able to afford or desire to drive a recently made GM vehicle.

Further, the GM system itself contains an inherent design flaw in that the system operates by monitoring the vehicle's rear doors. The system activates when either rear door is opened and closed up to ten minutes before the vehicle is started or while the vehicle is running. Once the system is activated, the vehicle is designed to sound five chimes and display a message in the driver information center that reads "Rear Seat Reminder/Look in Rear Seat" the next time the vehicle is turned off. It should be noted that this system does not monitor the physical presence of a child who may be seated in the backseat of the vehicle, and thus the system could in theory be frequently set off if a user simply places cargo (e.g. groceries, luggage, purses or packages) into the back seat of the vehicle regularly. This is obviously undesirable, as the audible chimes and reminder would still occur based on the opening and closing of the rear doors and would become very distracting and irritating over time, especially if no child is even present in the vehicle at the time. In addition, the notification system of the vehicle which displays a message in the driver information center could be easily and unintentionally overlooked, as what often occurs with other information in the driver information center such as check engine lights or other notifications, which may go unnoticed by users for days or weeks.

Child car seats with integrated child sensing systems and/or sensors and parent alerting devices also contain several limitations. The first of these limitations is obvious in that the sensors or technology of the device is only available within the specific car seat device itself. In a scenario where a child outgrows one of such car seats, which may happen a number of times during the course of the child's life, the parents of the child would simply have to purchase another larger seat to retain the sensing and alerting benefits of the prior car seat that was being used. This for many individuals may be financially impractical and not possible, as many such seats are extremely expensive compared to seats without the sensing/alerting features. Therefore, the benefits of the car seat are only available to that specific car seat at any point in time.

Clip on sensor devices may provide a user with a way to use a safety technology on any number of car seats regardless of brand and size, but also contain limitations in that they are battery powered. Due to the limited nature of the battery life, the battery in the device die without the adult's knowledge or due diligence to change the batteries regularly. As a result of this instance, the sensor may no longer function, unbeknownst to the adult, and could lead to an accident with the child who is seated in the seat by virtue of the sensor failing to notify the adult of the child's presence due to the dead batteries.

Further, both integrated child car seat sensors devices and clip-on type sensors typically operate using a mobile application for a smart device such as a cell phone. This is problematic especially for older users such as grandparents who are more likely to forget a child is in the back seat as a biproduct of their aging. These individuals are also less likely to have a smart phone or are less capable of using a mobile application. As such, many grandparents may not have a mobile phone that is compatible with the accompanying mobile application of the car seat or clip-on device, rendering the device generally useless.

In addition, mobile applications are prone to error by users, regardless of age. One such error includes the failure of a user to ensure their phone alerts or notifications are not silenced or in "silent mode" when using the App. Such modes are common on all smart phones and other smart devices and certain mobile applications and smart devices even allow a user to only receive notifications or alerts from certain applications once given permission. In addition, many smart devices have a "do not disturb" mode wherein application alerts or notifications are silenced. Thus, there are numerous instances when a user can unintentionally and unknowingly create an environment on their mobile device whereby, they would not be adequately notified of the notifications or alerts of the car seat device and thereby render the purpose of the alerting device obsolete.

Therefore, there exists a long felt need in the art for an improved backseat child occupancy alert system that overcomes the limitations of existing devices in the art. There is also a long felt need in the art for an improved backseat child occupancy alert system that is not specific to a particular vehicle or car seat device, and that can be transferred readily to and from any number of vehicles or car seats. Finally, there is a long felt need in the art for an improved backseat child occupancy alert system that does not utilize a mobile application to notify the user of the presence of a child in a vehicle.

In this manner, the improved backseat child occupancy alert system of the present invention accomplishes all of the forgoing objectives, thereby creating a system that overcomes the limitations of existing devices in the prior art and that can be transferred readily from and to any number of vehicles or car seats. The system also does not utilize a mobile application to notify the user of backseat occupancy and thus avoids any number of unintentional errors related to a mobile application that can occur and have been described herein.

SUMMARY

The following presents a simplified summary in order to provide a basic understanding of some aspects of the disclosed innovation. This summary is not an extensive overview, and it is not intended to identify key or critical elements or to delineate the scope thereof. Its sole purpose is to present some concepts in a simplified form as a prelude to the more detailed description that is presented later.

The subject matter disclosed and claimed herein, in one embodiment thereof, comprises an improved backseat child occupancy alert system. The child safety seat system comprises a first sensing component. The first sensing component comprises a front surface and a pair of sidewalls that extend downwardly and away from the front surface forming a U-shaped bracket. The first sensing component is placed over a seat belt buckle housing of whichever seat a child may be sitting in in the rear of a vehicle. The sensing component further comprises a motion sensor, a display, and a speaker.

The child safety seat system further comprises a second sensing component. The second sensing component comprises a front surface and a pair of sidewalls that extend downwardly and away from the front surface forming a U-shaped bracket. The second sensing component is placed over a seat belt buckle housing of a driver's seat. The second sensing component further comprises a motion sensor, a display, and a speaker.

The first and second sensing components are in electrical communication with one another via a connecting component. The connecting component may be a physical tether wiring that connects the first and second sensing components. The tether may also include a USB or power outlet adapter powering means that allows the device to be continuously powered by an outlet of the vehicle. Further, the display of both the first and second sensing components may illuminate when the first and second sensing components detect that both seatbelts are buckled. The displays may then produce a flashing display and audible alarm tone when the drive seatbelt is unbuckled but the child seat is still buckled, and the alarm can only be disarmed by the unbuckling of the child's seatbelt.

The system further includes a dashboard mounted display component comprising a LED display screen and a speaker. The display screen then further alerts the user via a rapid flashing display and audible tone of the condition of the child seat (e.g. whether the child seat is still buckled) in conjunction with the first and second sensing components. The display screen has differing embodiments including a plurality of mounting apparatuses that allow the display component to be secured on for example and without limitation: A dashboard surface, a gauge cluster surface, an air vent, a windshield, or a side window surface, etc. to be in best view of the user but not to distract the driver from operating the vehicle.

In a further embodiment of the present invention, a kit for retrofitting a child safety system for a car seat, is presented and includes a package that is configured for retail sale. The package comprises a first and second sensing components each comprising a screen, speaker and motion sensor. The kit further comprises a connecting device for connecting the first and second sensing components and an instruction manual for setting up the child safety system. The kit further comprises a display component.

In a yet still further embodiment of the present invention, a method for installing a child seat safety system, is described an includes the steps of initially obtaining a package containing components for a child seat safety system and then reviewing the instructions for installing the child seat safety system. Next, a first sensing component is placed on a child seat belt buckle and a second sensing component is positioned in an area for a driver. The method may also comprise the steps of connecting the two sensing components and testing the system to make sure the system is operational after installation.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
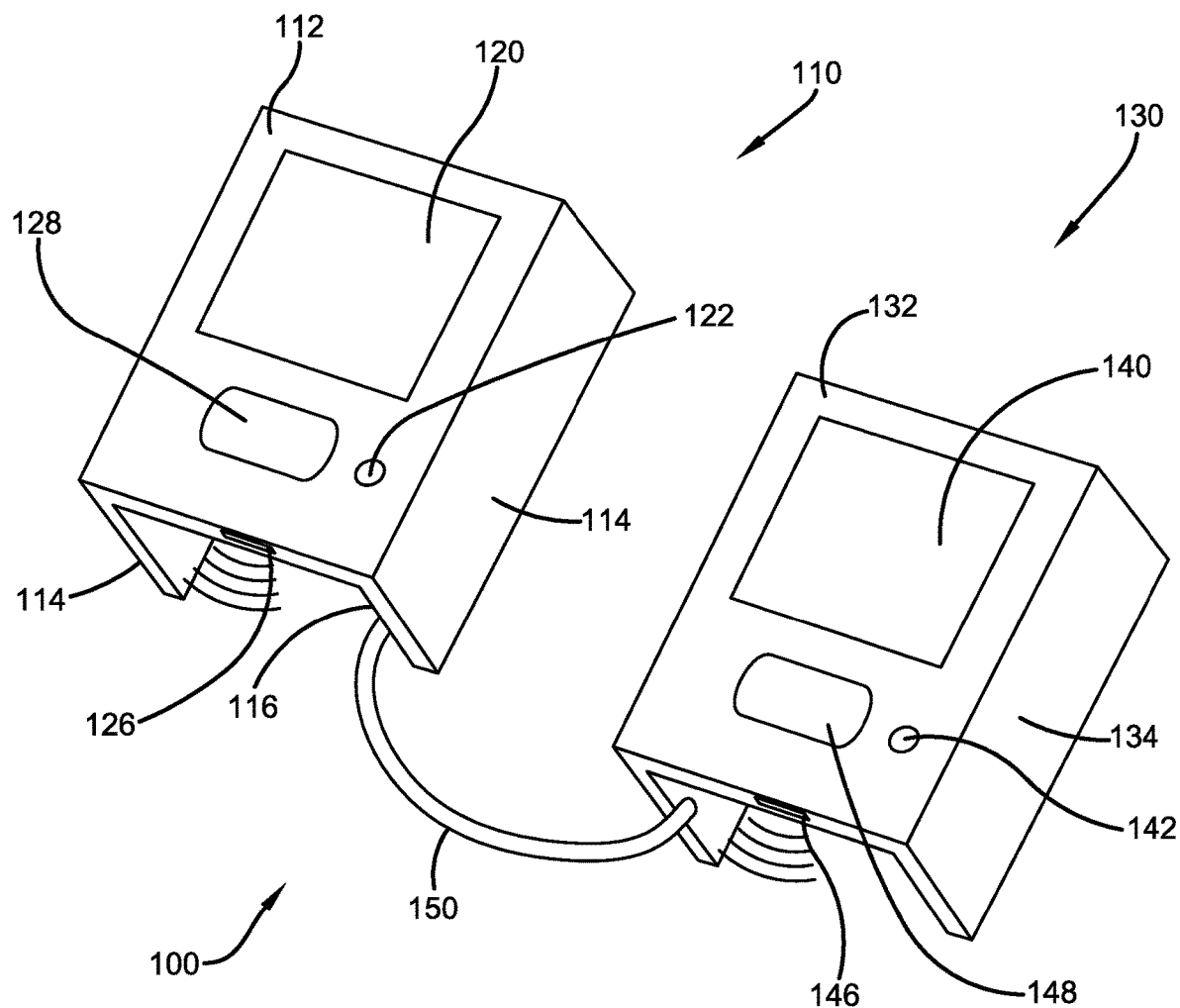
FIG. 1 illustrates a perspective view of a first and second sensing component of a child safety seat system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As noted above, there exists in the art a long felt need for an improved backseat child occupancy alert system that overcomes the limitations of existing devices by providing a system where a user can be prevented from accidently leaving a child in the back seat of a vehicle via a system that is not specific to a particular vehicle or car seat, and that can be transferred readily and easily from and to any number of vehicles or car seats. There is also a need for an improved vehicle child alert system that does not utilize a mobile application to notify the user of the presence of a child in a vehicle, which as noted previously is susceptible to unintentional errors, but instead provides an alternative notifying means.

The present invention in one exemplary embodiment, discloses an improved backseat child occupancy alert system. The system has at least two sensors where one sensor is placed on the seat belt buckle housing of the child's seat and the other is placed on the seat belt buckle housing of the driver's (adult) seat. The sensors are further linked by a tether that allows each sensor to be in electrical communication with the other. The tether may also include a USB or other power outlet member that can be inserted into a vehicle's USB or power outlet receptacle to power each sensor and the system. Each sensor also includes a speaker and an LED screen that illuminates with a green screen when both sensors detect both seatbelts are buckled. The sensors then produce a red flashing display and audible alarm tone when the driver seatbelt is unbuckled but the child seat is still buckled. The alarm(s) can only be disarmed by the unbuckling of the child's seatbelt thereby preventing the adult from leaving the child unattended in the car. The system further includes a dashboard mounted display that provides alerts for the user via a similar flashing display and audible tone of the condition of the child seat.

Referring initially to the drawings, FIG. 1 illustrates a perspective view of a child safety seat system 100. The child safety seat system 100 comprises a first sensing component 110. The first sensing component 110 is configured to fit over and engage a seat belt buckle 11. The first sensing component 110 comprises a front surface 112 and a pair of generally parallel sidewalls 114. The pair of sidewalls 114 extend generally perpendicularly and downward out of and away from the front surface 112 forming a U-shaped inner surface 116. As such, the first sensing component generally resembles a U-shaped bracket that fits over the buckle 11.

Figure 2:
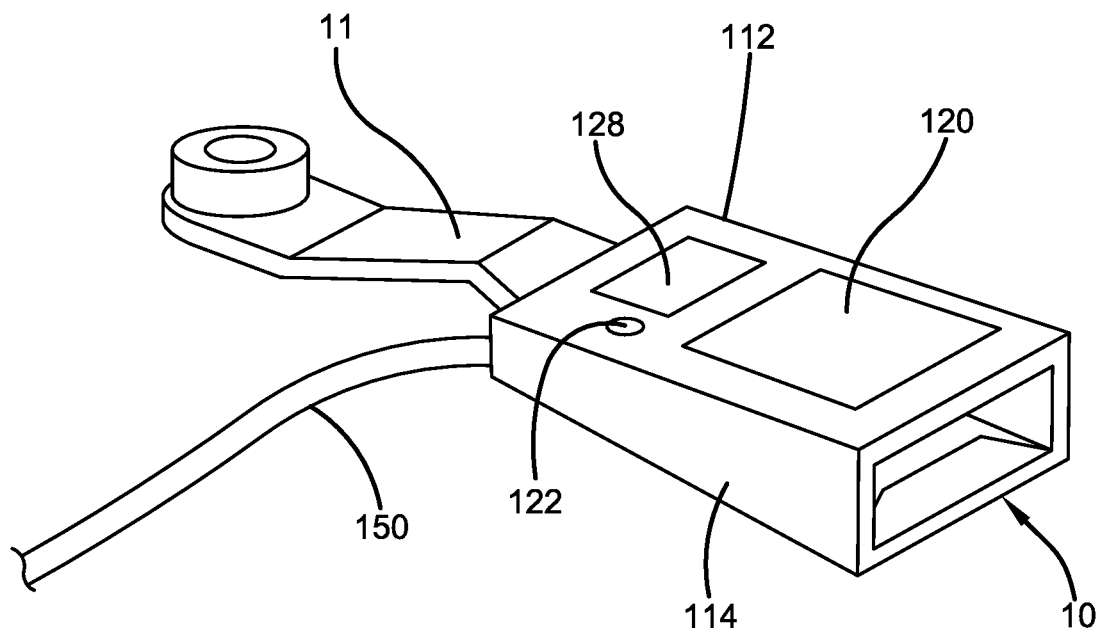
FIG. 2 illustrates a perspective view of the first sensing component of the present invention attached to a seat belt buckle assembly of a vehicle in accordance with the disclosed architecture.

As illustrated in FIG. 2, the pair of sidewalls 114 and the front surface 112 form the continuous opening U-shaped inner surface 116 or channel on the back side of the first sensing component 110 or the inside of the "U" that is formed by the sidewalls 114 and front 112, that can be placed over/around the seat belt buckle 11. The first sensing component 110 further comprises a motion sensor 126, a display 120, and a speaker 128. The motion sensor 126 is integrated into the first sensing component 110. The display 120 is typically a LED screen integrated into the front surface 112 with the speaker 128 integrated adjacently. The speaker 128 is in communication with the motion sensor 126 such that the speaker 128 will emit a noise when the motion sensor 126 detects motion. The motion sensor 126 detects the movement of a seat belt 12 as it enters or leaves a buckle opening 10 of the seat belt buckle 11 or other movement of the belt material of the seat belt 12, door or the like where motion can be used to set off the alarm.

The child safety seat system 100 further comprises a second sensing component 130. The second sensing component 130 is configured to fit over and engage a seat belt buckle 11 of the driver's seatbelt. The second sensing component 130 comprises a front surface 132 and a pair of generally parallel sidewalls 134. The pair of sidewalls 134 extend generally perpendicularly and downward out of and away from the front surface 132 forming a U-shaped inner surface 136. As such, the first sensing component generally resembles a U-shaped bracket that fits over the buckle 11.

The pair of sidewalls 134 and the front surface 132 form the continuous opening U-shaped inner surface 136 or channel on the back side of the second sensing component 130 or the inside of the "U" that is formed by the sidewalls 134 and front 132, that can be placed over/around the seat belt buckle 11. The second sensing component 130 further comprises a motion sensor 146, a display 140, and a speaker 148. The motion sensor 146 is integrated into the second sensing component 130. The display 140 is typically a LED screen integrated into the front surface 132 with the speaker 148 integrated adjacently. The speaker 148 is in communication with the motion sensor 146 such that the speaker 148 will emit a noise when the motion sensor 146 detects motion.

Figure 3:
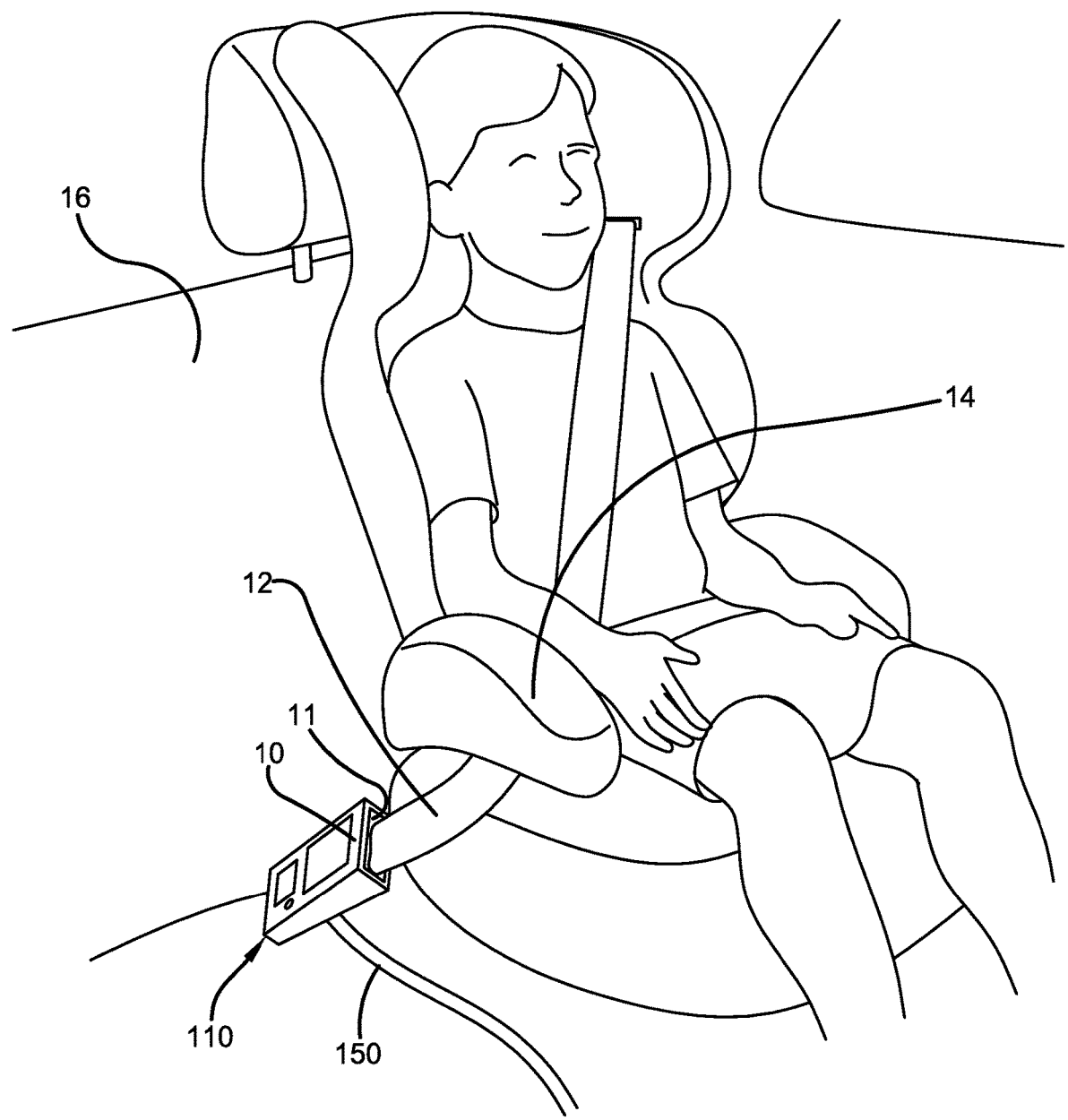
FIG. 3 illustrates a perspective view of the first sensing component of the present invention attached to a seat belt buckle that is securing a child in the back seat of a vehicle in accordance with the disclosed architecture.

It is contemplated that the child safety seat system 100 has at least two sensing components 110 and 130, with one 110 attaching to the seat belt buckle opening 10 of the body of the driver's seatbelt and the second 130 attaching around the seat belt buckle opening 10 of the body of a child's seatbelt (as shown in FIG. 3 and which will be discussed more fully below). However, it is further contemplated that multiple embodiments of the child safety seat system 100 may include a plurality of sensing components where the number of sensing components would be equal to the number of seat belts that a vehicle contains. Alternatively, the sensing components may be connected to the door latch area so that they have to be moved which will trigger the alarm or on a portion of the belt of the seat belt itself, so that when the seat is unbuckled and the belt portion is retracted, the sensor will be activated.

The child safety seat system 100 further comprises a connecting component 150. The connecting component 150 physically and electrically links the first and second sensing components 110 and 130 so that they are in electronic communication. The connecting component 150 may comprise a tether wire. Alternatively, the first and second sensing components 110 and 130 may be wirelessly connected.

FIG. 3 illustrates a perspective view of the child safety seat system 100 attached to a seat belt such as the buckle 11 that is securing a child in the back seat 16 of a vehicle. It is in discussing this figure that the full function of the child safety seat system 100 will now become apparent. Once the first sensing component 110 has been placed around the seat belt or buckle 11 which is securing a child's seat 14 in the rear seating 16 portion of a vehicle, the first sensing component 110 can then be linked via the tether 150 to the second sensing component 130 that has been placed around the seat belt buckle 11 of the driver's seat, passenger seat, door, dashboard or other area in the car where the operator can be notified of the removal of the sensor. The tether 150 connection allows each of the first and second sensing components 110 and 130 to remain in constant electrical communication with one another to allow the system 100 to function in the following manner.

Once the first sensing component 110 is placed around the child's seat belt or buckle 11, the motion sensor 126 of the first sensing component 110 will detect that the buckle or belt material of the seat belt 12 is secured within the seat belt buckle opening or belt 10. The second sensing component 130 which has been placed on the driver's seat belt buckle 11 then detects whether the buckle or belt of the driver's seat belt 12 is secured within the seat belt buckle opening 10 for the driver's seat. If both seatbelts 12 are then detected as being buckled or secured, the display 140 of the second sensing component 130 emits a continuous green light or screen to notify the driver that both their seat belt 12 and the child's seat belt 12 behind them have been secured. In a differing embodiment of the system 100, the first sensing component 110 may also perform the same green illumination function via its own display 120. The displays 120 or 140 may also display words, symbols, characters in addition to colors and combination of all the foregoing.

Once the driver unbuckles their seat belt 12 and attempts to exit the vehicle, communication occurs in the first and second sensing components 110 and 130 which are interconnected via the tether 150, and both speakers 128 and 148 begin to emit an audible tone if the first sensing component 110 is still secured (e.g. the child is still buckled in the safety seat). The tone may include differing embodiments of the system 100 as audible tone such as but not limited to: A continuous tone, a series of beeps, a series of tones or beeps that vary in frequency and/or intensity, a pre-recorded message reminding a user to remove their child from the back seat, a song, animal sounds, chimes or other sounds that a user may prefer, etc., all of which serve to alert the driver, passenger or other user that the rear seat belt 12 which is securing the child into the child seat 14 is still buckled. The tone then proceeds to continuously emit until a user physically disengages the child's seat belt 12 from the buckle 11. To further alert the user that the rear seat belt 12 is still buckled, both displays 120 and 140 may flash red in a rapid and continuous fashion until the child's seat belt 12 is disengaged from the buckle 11 by the user. In another embodiment, each of the first and second sensing components 110 and 130 further comprise a microphone 122 and 142 respectively. The microphones 122 and 142 cooperate with the corresponding speakers 128 and 148 so that the driver, passenger, parent or other person in the car can talk to the child and serve as a two-way communication system, particularly in large SUVs where the child may be buckled into the third row seat and far away from the front of the vehicle.

Figure 4:
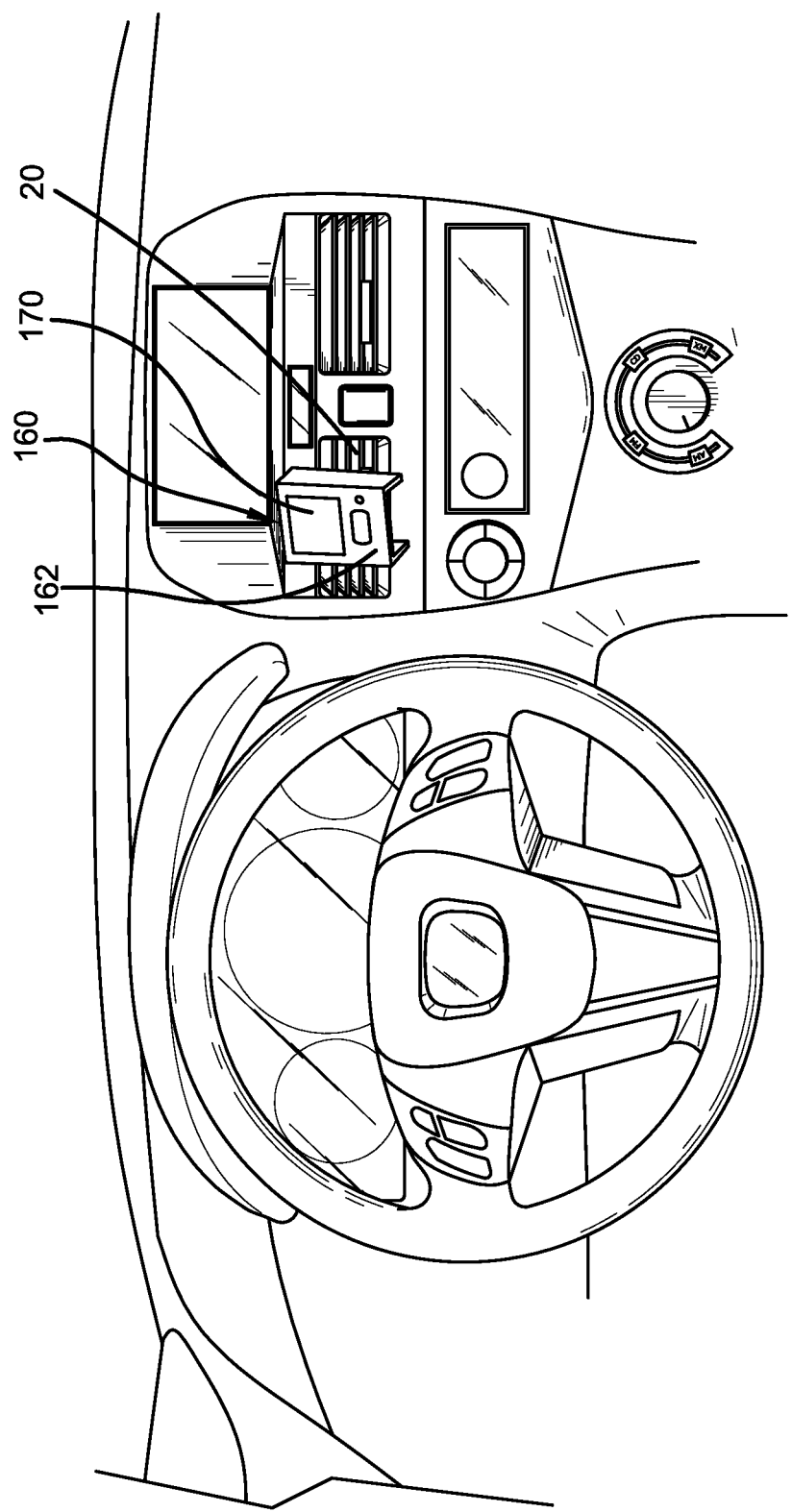
FIG. 4 illustrates a perspective view of a display component of the child safety seat system the present invention mounted to the air vent of a vehicle in accordance with the disclosed architecture.
Figure 5:
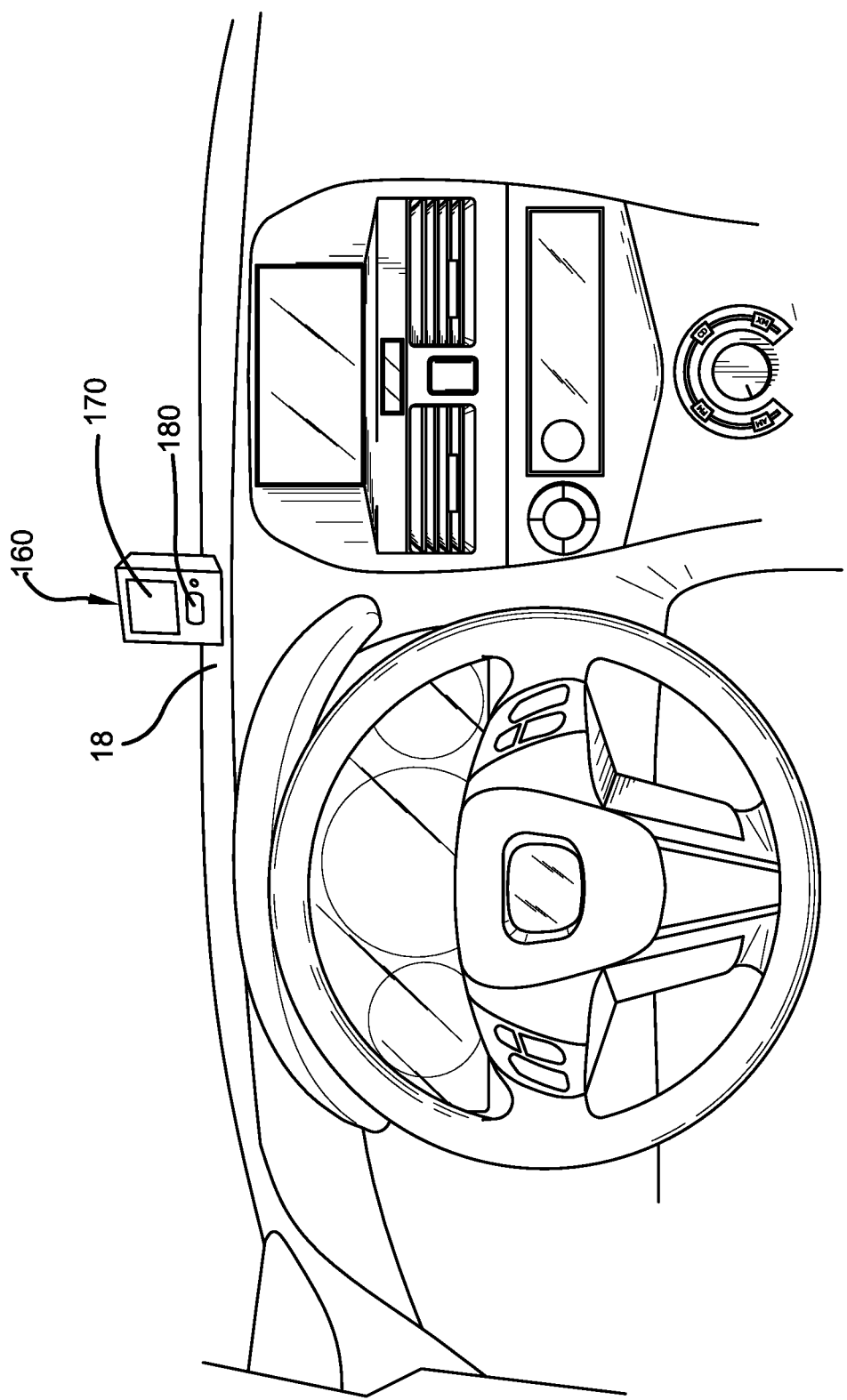
FIG. 5 illustrates a perspective view of the display component of the child safety seat system the present invention mounted to the dashboard of a vehicle in accordance with the disclosed architecture.

As illustrated in FIGS. 4 and 5, the child safety seat system 100 further comprises a display component 160. The display component 160 is configured to display a status of the child safety seat system 100 and further alert the user to unbuckle a child seated in the rear seat 16. The display component 160 has a generally square or rectangular plastic body that has a front surface 162. The front surface 162 faces the user and includes a display screen 170 and a speaker 180 like that of the first and second sensing components 110 and 130 of the child safety seat system 100. It is contemplated that the display component 160 may also be interconnected and in electrical communication with the first and second sensing components 110 and 130 via the tether 150, or other wireless communication means such as but not limited to Wi-Fi, Bluetooth, RFID proximity readers, etc.

The display component 160 functions simultaneously with the first and second sensing components 110 and 130 while providing a user with a more visible way to see the status of the first and second sensing components 110 and 130. As shown in FIG. 4. the display component 160 may have a mounting system that allows the display component 160 to attach to a plurality of vehicle surfaces via the mounting device located on its rear surface, such as the vehicle air vent 20. In a differing embodiment of the system 100, the display component 160 may be mounted to the dashboard surface 18 of the vehicle via a mounting means, as seen in FIG. 5.

It is further contemplated that the display component 160 can be mounted within the interior of the vehicle via a plurality of mounting systems. These mounting systems can include, but are not limited to, suction cups, adhesive strips or members, fixed clasps, adjustable clasps, magnets, a magnetic rear surface, a cradle, hook and loop fasteners, etc. Further, the display component 160 may be mounted in a plurality of locations within the vehicle, with the locations shown in FIG. 4 and FIG. 5 only serving as two of numerous other locations. These locations could include, but are not limited to, the windshield of the vehicle, the side-window of the vehicle, the sun visor of the vehicle, the gauge cluster of the vehicle, the steering wheel of the vehicle, the infotainment system of the vehicle, door handles, or any other place where the display component 160 is easily and readily visible to the user and does not distract the driver or operator of the vehicle.

Further, the child safety seat system 100 is preferably powered by a USB or power outlet powering means within the vehicle, and the tether 150 may include an appropriate USB or power outlet adaptor or plug to engage a USB or power outlet adaptor or plug and power the child safety seat system 100 as such. By being powered by the USB or power outlet of the vehicle, the child safety seat system 100 receives a constant and uninterrupted stream of power that is not dependent on batteries which may lose their power and render the system faulty, unbeknownst to the user. The tether 150 may also have a means to interconnect or link multiple sensing components (e.g. more than two) to one tether 150 to allow for the child safety seat system 100 to be powered by only one USB receptacle/or power outlet of a vehicle for convenience purposes.

Figure 6:
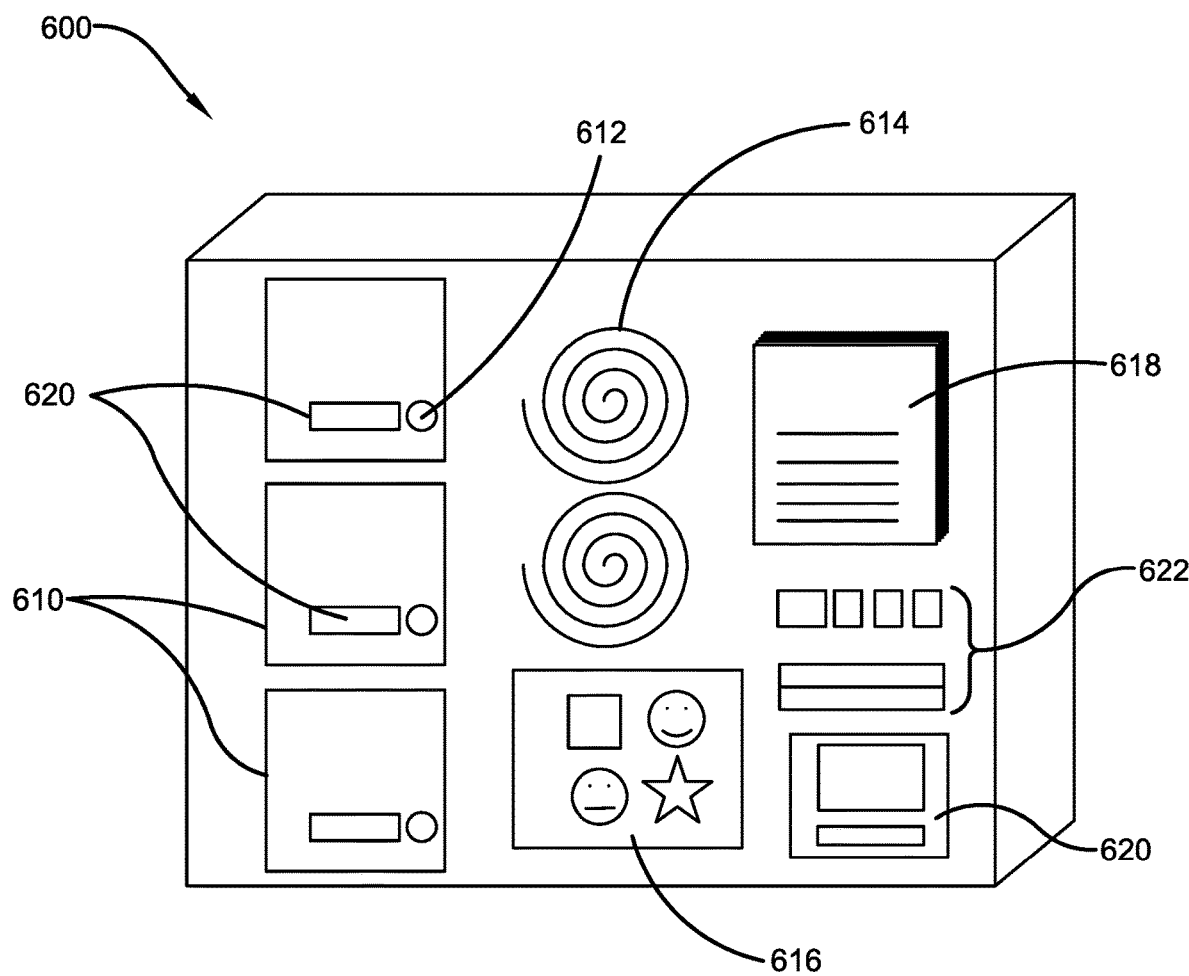
FIG. 6 illustrates a kit including the components of the child safety seat system for installation by a user in a vehicle in accordance with the disclosed architecture.

The child safety seat system 100 may be adorned with any variety of colors, designs, characters or may be personalized by the user of the system such as with stickers or labels that may accompany the system. FIG. 6 provides a kit 600 that includes a number of sensing components 610 (each similar to the first and second sensing components 110 and 130). The kit 600 is configured for retail sales which includes an in-store arrangement as well as sales over the internet. The sensing components 610 are shown with a microphone 612 which may be used as part of two-way communication system to allow the driver or parent to engage with the child and keep the child calm while driving. The kit 600 includes one or more tethers 614, sheet of labels or stickers 616 to allow the customer of the kit to personalize the sensing components 610. In addition, the kit 600 includes a set of instructions 618 to guide the use on the set up the system 100, warranty information, FAQs and the like. The display screens 620 of the sensing components 610 may be set up to display words, symbols in addition to characters, colors or combination thereof. The kit 600 also includes a number of different attachment devices, such as a magnet, hook and loop fasteners, clips and the like shown generally by reference number 622. Finally, the kit 600 may further comprise a display component 624 similar to the display component 160 of the previous embodiment 100.

Figure 7:
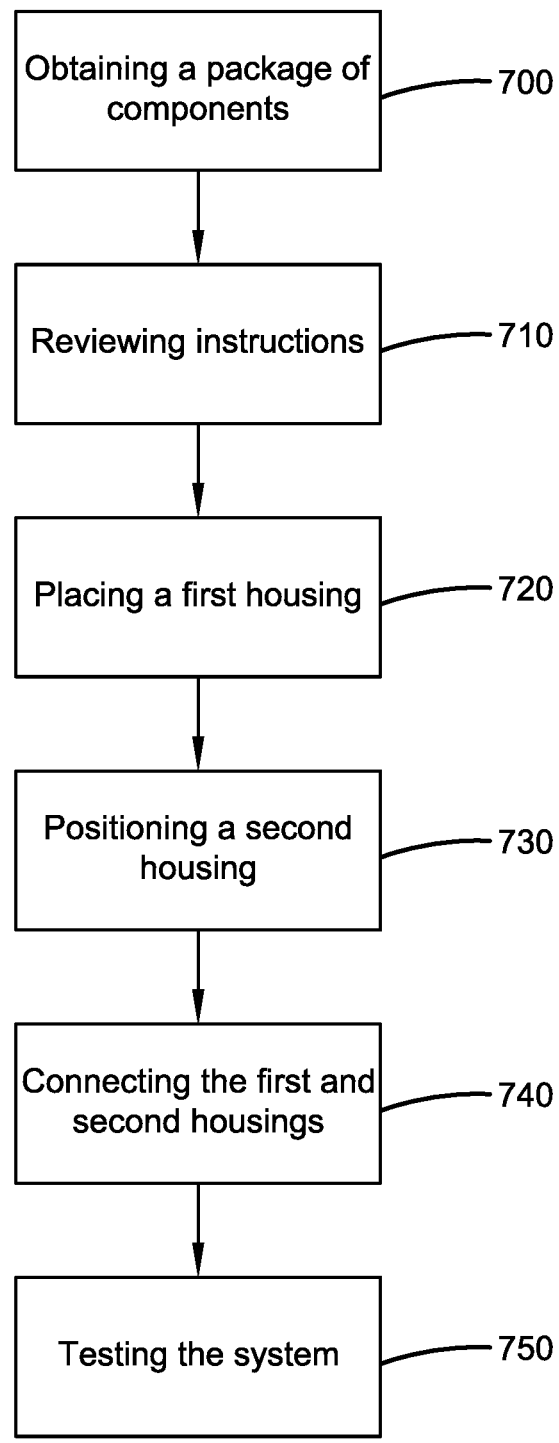
FIG. 7 illustrates a block diagram showing an exemplary method of installing the child safety seat system of the present invention in accordance with the disclosed architecture.

FIG. 7 illustrates a block diagram setting forth an exemplary method 700 for installing the child safety seat system 100 of the present invention. The method 700 comprises initially obtaining a package containing the components of the system 100. Next, the instructions are reviewed at step 710 and the first sensing component 110 is installed over a seatbelt buckle restraining a child safety seat at step 720. The second sensing component 130 is positioned over a seatbelt buckle restraining the driver at step 730. The first and second sensing components 110 and 130 are connected to one another at step 740 and the system 100 is tested at step 750 to determine if the system 100 is properly installed. The first and second sensing components 110 may be connected wirelessly or via the connecting component 150. The system 100 may further comprise a display component 160 for displaying a status of the child seat safety system.

Notwithstanding the forgoing, the child seat safety system 100 and method of use 700 can by any suitable size, shape, and configuration as is known in the art without affecting the overall concept of the invention, provided that it accomplishes the above stated objectives. One of ordinary skill in the art will appreciate that the shape and size of the child seat safety system 100 and its devices and its various components, as show in the FIGS. Are for illustrative purposes only, and that many other shapes and sizes of the child seat safety system 100 are well within the scope of the present disclosure. Although dimensions of the child seat safety system 100 and its components (i.e., length, width, and height) are important design parameters for good performance, the child seat safety system 100 and its devices and various components may be any shape or size that ensures optimal performance during use and/or that suits user need and/or preference.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A child safety seat system comprising:
a first sensing component comprising a motion sensor, a display and a speaker, the first sensing component configured to a fit over a seatbelt buckle;
a second sensing component comprising a motion sensor, a display and a speaker, the second sensing component configured to fit over a second seatbelt buckle; and
wherein the first sensing component is in electrical communication with the second sensing component; and
wherein each of the first and second sensing components further comprise a microphone; and
wherein each microphone cooperates with the corresponding speaker enabling two-way communication between the first and second sensing components.

2. The child safety seat system of claim 1 further comprising a connecting component for connecting the first and second sensing components.

3. The child safety seat system of claim 2, wherein the connecting component is a wire tether.

4. The child safety seat system of claim 1, wherein the first and second sensing components are wirelessly connected.

5. The child safety seat system of claim 1 further comprising a display component for displaying a status of the child safety system.

6. The child safety seat system of claim 5, wherein the display component is in wireless communication with both the first and second sensing components.

* * * * *